Nov. 21, 1939. J. H. BOHRER 2,181,086
HOSE GRIP AND PROTECTOR
Filed Feb. 23, 1938
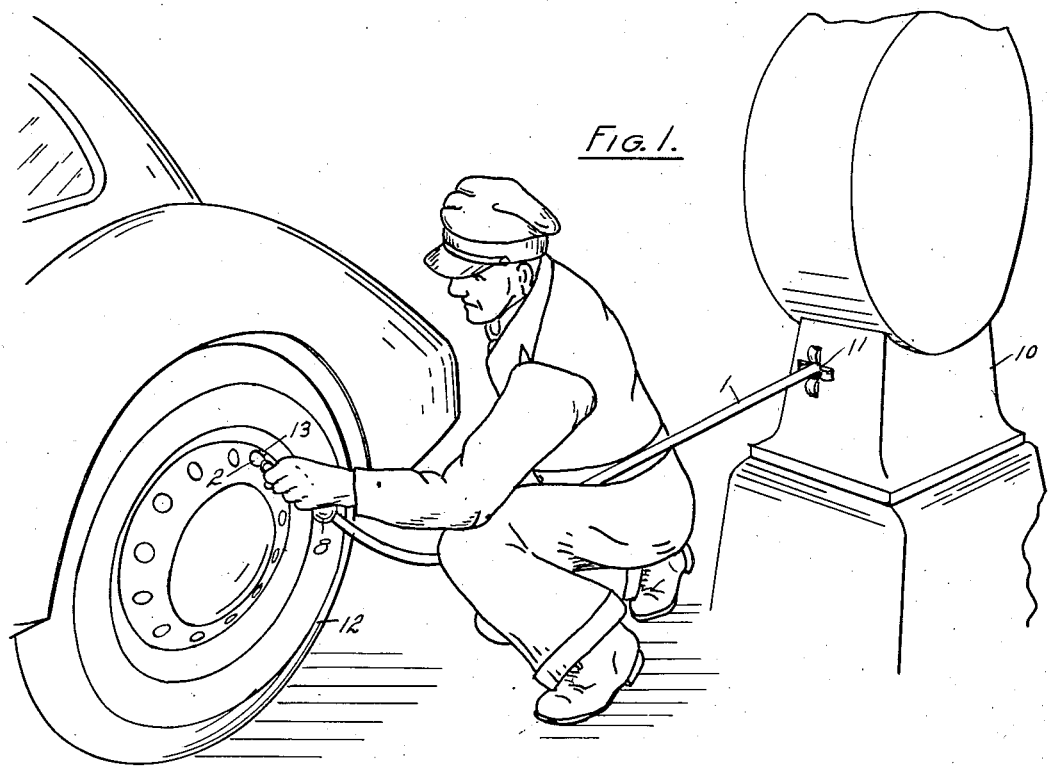
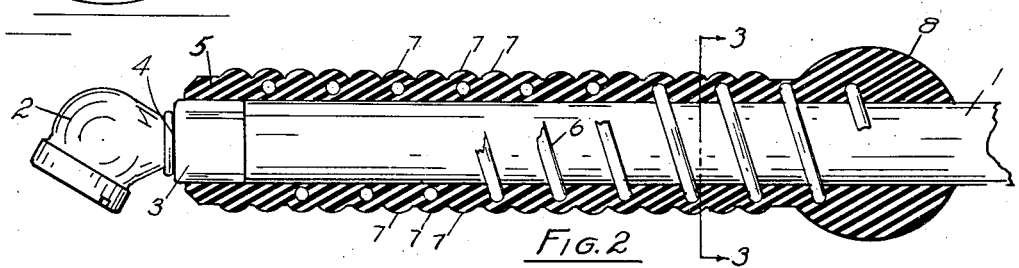
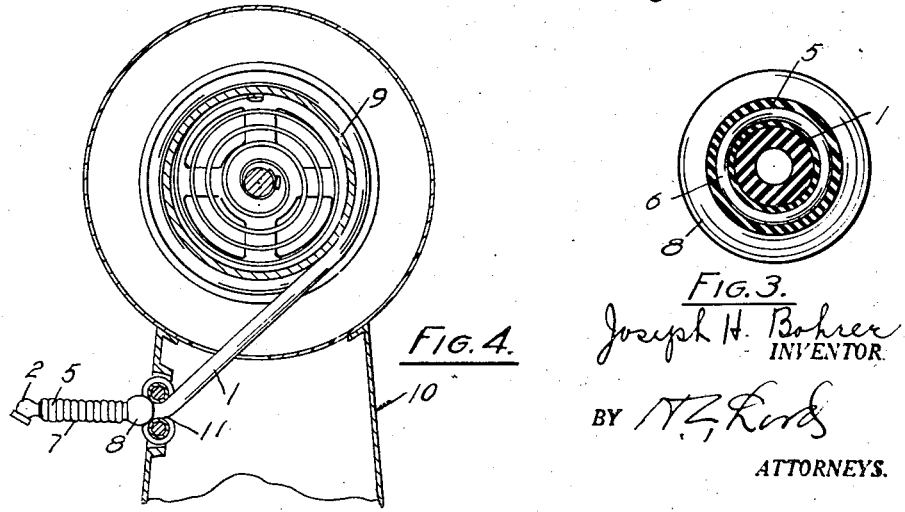

Patented Nov. 21, 1939

2,181,086

UNITED STATES PATENT OFFICE 2,181,086

HOSE GRIP AND PROTECTOR

Joseph H. Bohrer, Erie, Pa., assignor to Continental Rubber Works, Erie, Pa., a corporation of Pennsylvania Application February 23, 1938, Serial No. 192,113

1 Claim. (Cl. 138—61)

Air hose, as usually found at filling stations, is mounted on a reel and connected with an air supply through the reel. The reel as ordinarily arranged is spring wound so that the air hose is withdrawn when released. The present invention is designed to provide a protecting device for the operating or free end of the hose, affording a better grip for the end of the hose, preventing kinking of that end of the hose and forms a stop for the hose as it is returned by the reel, and provides a protection for the chuck or valve at the end of the hose when dropped to the pavement. Features and details of the invention will appear from the specification and claim.

A preferred embodiment of the invention is illustrated in the accompanying drawing as follows:

Fig. 1 shows a perspective view of the hose in the ordinary set up and in position of use.

Fig. 2 a longitudinal section of the protector in place on a hose.

Fig. 3 a section on the line 3—3 in Fig. 2.

Fig. 4 a sectional view showing the outline and general arrangement of the reel.

1 marks the hose. This is provided with a valve or chuck 2 at its free end. This chuck is secured to the hose by a clamping ring 3. The valve has a small shoulder 4 at its union with the hose. A protecting tube 5 of rubber has an inside diameter approximating that of the air hose 1. This is reinforced by a coil spring 6 which is preferably embedded in the rubber as it is vulcanized. This coil spring, while permitting a certain freedom or flexibility of the hose at the end, does prevent kinking of the hose when it is pulled at an angle. The outer surface of the protecting tube has annular ribs 7. These preferably extend directly around the wall and do not follow the line of the coil spring. The protecting tube terminates at its rear end in an enlargement 8, preferably in the form of a ball which is designed to form a stop for the hose as it is withdrawn by the reel. An ordinary reel is shown in perspective in Fig. 1 and in section in Fig. 4. In Fig. 4 a spring locked reel 9 is indicated. This is mounted in the reel case 10 having the roller guarded opening 11 for the hose. The ball 8 engages the wall of the opening 11 so as to limit the return movement of the hose.

In Fig. 1 the hose is shown in use. An automobile tire 12 has a tire valve 13 and this is engaged by the chuck or valve 2 in the filling operation in the usual manner.

In drawing the air tube to position to engage the tire valve the end of the tube is swung so as to make the proper engagement and this often involves a comparatively short bend at the free end of the air tube. The protector while permitting some flexibility in this respect so as to prevent localizing of the bend prevents kinking as this is pulled. The gripping surface gives a very much better hold on the air tube. If the air tube is dropped the rubber tube holds the valve or check 2 off the pavement and the enlargement 8 makes a cushion stop for the hose when it reaches the opening.

What I claim as new is:

A hose grip and protector comprising a rubber tube adapted to fit over and engage the walls of the hose to be gripped and protected, said tube having an integral rubber enlargement at one end forming a reel stop, the enlargement being of greater diameter than the balance of the tube and the body of said tube being formed of resilient rubber throughout.

JOSEPH H. BOHRER.